3,798,257
PROCESS FOR THE PRODUCTION OF BIS(2-HYDROXYETHYL)TEREPHTHALATE
Yulin Wu, Bartlesville, Okla., assignor to Phillips Petroleum Company
No Drawing. Filed May 5, 1972, Ser. No. 250,586
Int. Cl. C07c 69/82
U.S. Cl. 260—475 P                                6 Claims

ABSTRACT OF THE DISCLOSURE

A method of producing bis(2-hydroxyethyl)terephthalate which involves reacting an alkali metal salt of terephthalic acid with ethylene oxide in the presence of carbon dioxide.

---

This invention relates to the production of bis(2-hydroxyethyl)terephthalate.

In one of its more specific aspects, the invention relates to the production of bis(2-hydroxyethyl)terephthalate from dipotassium terephthalate.

The production of bis(2-hydroxyethyl)terephthalate and its condensation to form polyethylene terephthalate which is melt spun to form polyester fibers and filaments is well known. For example, bis(2-hydroxyethyl)terephthalate can be formed by the direct esterification of terephthalic acid with ethylene oxide in the presence of an alkali metal hydroxide, such a method being disclosed in U.S. Pat. 3,101,366.

There has now been discovered a method of producing bis(2-hydroxyethyl)terephthalate from an alkali metal salt of terephthalic acid without the necessity of converting the alkali metal salt to terephthalic acid.

According to this invention there is provided a method of producing bis(2-hydroxyethyl)terephthalate which comprises contacting an alkali metal terephthalate with an epoxide and carbon dioxide under conditions to convert the dipotassium salt to bis(2-hydroxyethyl)terephthalate and recovering the product.

While ethylene oxide is preferred, other epoxides can be employed, these including propylene oxides, butene oxides, 1,3-butadiene dioxide, octene oxides and styrene oxide.

The conditions under which the reaction is conducted involve a temperature within the range of from about 25° C. to 150° C., a carbon dioxide pressure up to about 2000 p.s.i.g. or more for a period of up to about 10 hours, the presence of carbon dioxide being essential to the reaction.

The carbon dioxide can be employed as a component of a gaseous mixture comprising ethylene oxide and/or an inert gas such as nitrogen.

The method of the present invention is illustrated by the following runs in which the general procedures under which the reactions were substantially identical except that the reaction conditions were different. While dipotassium terephthalate is employed in the examples, the invention is also employable with all alkali metal terephthalates including sodium and lithium.

EXAMPLE I

An aqueous solution of 15 parts by weight of dipotassium terephthalate in 60 parts by weight of water was formed in a reactor. The reactor was purged of extraneous gases with carbon dioxide after which the reactor was pressured with carbon dioxide to 300 p.s.i.g. at room temperature. 13.3 parts by weight of ethylene oxide were added and the reactor was heated to 68° C. at which temperature the pressure was 500 p.s.i.g. The reaction was allowed to proceed at 68° C. for two hours during which period the pressure decreased to 390 p.s.i.g.

The contents of the reactor were filtered and the bis (2 - hydroxyethyl)terephthalate was recovered as white crystals from a filtrate comprising aqueous potassium bicarbonate and terephthalic acid.

The bis(2-hydroxyethyl)terephthalate (BHET) was purified by recrystallization and had a melting point of 108° C. Its analysis was confirmed by gas-liquid chromatography.

The results of two runs made under these conditions were as follows

| | Reaction conditions | | | |
|---|---|---|---|---|
| | Temp., °C. | Time, min. | ΔP, pounds [1] | Yield, percent |
| Run No.: | | | | |
| 1 | 60 | 410 | 90 | 88 |
| 2 | 90 | 55 | 110 | 78 |

[1] Decrease in carbon dioxide pressure from start to finish of reaction.

The above yield is based upon the moles of BHET produced and the moles of dipotassium terephthalate consumed in the reaction.

The above data indicate the operability of the method of this invention to produce large yields of bis(2-hydroxyethyl)terephthalate.

The method of this invention is one in which the presence of carbon dioxide is critical. This is illustrated by the following examples.

EXAMPLE II

The procedure of the aforementioned patent was carried out in a nitrogen atmosphere in the substantial absence of carbon dioxide.

33.2 parts by weight of terephthalic acid in 60 parts by weight of water were mixed with 4.4 parts by weight of sodium hydroxide in a reactor. Air was displaced from the reactor with nitrogen and 18 parts by weight of ethylene oxide were added. The reactor pressure was adjusted to 50 p.s.i.g. with nitrogen and the reaction mixture was maintained at 110° C. for 35 minutes.

The reaction product was recovered and crystallized from an aqueous solution to produce a 53.5% yield of bis(2-hydroxyethyl)terephthalate having a melting point of 109° C.

The above procedure was repeated under substantially identical conditions except that the reactor was pressurized to 50 p.s.i.g. with carbon dioxide. The product was recovered and crystallized from an aqueous solution to produce a 54.3% yield of bis(2 - hydroxyethyl)terephthalate having a melting point of 109° C.

These data show that the method of the aforementioned patent can be carried out either in the presence or in the absence of carbon dioxide, that is, the presence of carbon dioxide is not critical.

The method of the present invention can be shown to differ from that of the aforementioned patent in that the method cannot be carried out in the absence of carbon dioxide and that the presence of carbon dioxide is therefore critical.

EXAMPLE III

A reactor containing an aqueous solution of 15 parts by weight of dipotassium terephthalate in 60 parts by weight of water was purged with nitrogen. Ethylene oxide in an amount of 18 parts by weight was added and the reactor was adjusted to a pressure of 50 p.s.i.g. with nitrogen after which it was maintained at 100° C. for five hours.

Gas-liquid chromatographic analysis was unable to detect any bis(2-hydroxyethyl)terephthalate, the reaction mixture containing dipotassium terephthalate, and ethylene glycol.

A comparison of the procedures of Examples II and III indicate that in the method of this invention the presence of carbon dioxide is critical, this criticality distinguishing it from that method of the aforementioned patent.

It will be evident from the foregoing that the method of the present invention provides an improved method of producing bis(2-hydroxyethyl)terephthalate in avoiding the employment of terephthalic acid. Therefore, the purification of terephthalic acid is avoided. This purification step which has heretofore been required for the production of quality polyester fibers has long been a problem in those processes in which terephthalic acid was produced from dipotassium terephthalate during the process.

What is claimed is:

1. A method of producing bis(2-hydroxyethyl)terephthalate which comprises contacting a di-alkali metal salt of terephthalic acid with ethylene oxide and with carbon dioxide under conditions to produce bis(2-hydroxyethyl)-terephthalate and recovering said bis(2 - hydroxyethyl) terephthalate.

2. The method of claim 1 in which said di-alkali metal salt is dipotassium terephthalate.

3. The method of claim 1 in which said conditions include a temperature within the range of from 25° C. to 150° C., a pressure of up to about 2000 p.s.i.g. and a reaction time up to about 10 hours.

4. The method of claim 3 in which said carbon dioxide is contained in a gaseous mixture comprising an inert gas.

5. The method of claim 4 in which said carbon dioxide is contained in a gaseous mixture comprising ethylene oxide.

6. The method of claim 1 in which said carbon dioxide is present in an amount to provide a pressure of about 300 p.s.i.g.

References Cited
UNITED STATES PATENTS 3,674,835  7/1972  Boehmke _____ 260—475 P
3,101,366  8/1963  Vaitekunas et al. ____ 260—475 P

FOREIGN PATENTS 1,195,289  6/1965  Germany _____ 260—475 P

LORRAINE A. WEINBERGER, Primary Examiner

E. J. SKELLY, Assistant Examiner